(12) United States Patent
Batham

(10) Patent No.: US 6,345,087 B1
(45) Date of Patent: Feb. 5, 2002

(54) METHODS OF MONITORING MULTIPLE TRANSACTIONS

(75) Inventor: Andrew Guy Batham, Fife (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/247,821

(22) Filed: Feb. 11, 1999

(30) Foreign Application Priority Data

Feb. 13, 1998 (EP) .............................. 98301052

(51) Int. Cl.[7] .......................... H04M 3/22; H04M 15/00
(52) U.S. Cl. ................. 379/32.05; 379/32.03; 379/112.06; 379/133
(58) Field of Search ............... 379/112, 113, 379/133, 134, 229, 230, 111, 34, 112.01, 112.06, 32.01, 32.02, 32.05

(56) References Cited

U.S. PATENT DOCUMENTS

| | | |
|---|---|---|
| 5,437,009 A | 7/1995 | Lane |
| 5,465,286 A | 11/1995 | Clare et al. |
| 5,592,530 A * | 1/1997 | Brockman et al. ............. 379/34 |
| 5,761,502 A * | 6/1998 | Jacobs ......................... 379/220 |
| 6,091,801 A * | 7/2000 | Gulik ........................... 379/10 |

FOREIGN PATENT DOCUMENTS

| | | |
|---|---|---|
| EP | 0 534 241 A | 3/1993 |
| EP | 0 535 270 A | 4/1993 |
| GB | 2 129 255 A | 5/1984 |

* cited by examiner

Primary Examiner—Curtis Kuntz
Assistant Examiner—Rexford Barnie

(57) ABSTRACT

In a graphical call trace display showing progress of telephone calls in a public switched telephone network, successive events in the progress of a call are represented by respective segments of a line. Each segment is controlled in appearance (e.g. in color) to indicate the nature of the corresponding event, in accordance with information derived from signalling messages in a signalling network for controlling operation of the telephone network.

11 Claims, 4 Drawing Sheets

METHODS OF MONITORING MULTIPLE TRANSACTIONS

TECHNICAL FIELD

This invention relates to methods of monitoring the operational status of multiple transactions in a system, for example the progress of telephone calls in a public switched telephone network (PSTN), or of data transfers over the global computer network commonly referred to as the Internet,

BAKGROUND ART

Current PSTNs often comprise two networks operating in tandem: a transmission or bearer network for carrying actual voice and data signals, and a signalling network which is used to convey control information signals for establishing, monitoring and clearing respective connections for each communications transaction (such as a telephone call) between subscriber equipment over the transmission network. In many PSTNs the signalling network operates in accordance with the international standard Signalling System No. 7 (SS7).

In other networks, such as the Internet, the necessary control signalling may be combined with data. Thus, for example, in packet-switching systems the data (which may represent any of several kinds of user traffic, such as voice signals, graphical images or numerical data) are divided into packets each of which is transmitted independently over the network and has a 'header' associated with it. The header contains control information which identifies the communications transaction to which it relates (for example by identifying the intended recipient) and enables intermediate network equipment to route the packet appropriately towards its destination.

In order to monitor and maintain the operation of communications systems, it is desirable to be able to collect control information, collate it and display summaries. This may be done, for example, by connecting a passive monitoring device to a signalling link (in the case of an SS7 signalling network) to collect copies of control messages traversing the link. Examination of specific data fields within each message enables different messages relating to the same communications transaction to be correlated, and listed together.

Conventional monitoring devices simply list the messages in the order of occurrence, detailing the contents of each message either as received (e.g. in binary digits) or by a simple abbreviation or mnemonic label. These devices have the disadvantage that they either provide so much information that the user is overwhelmed, or they are restricted to providing information on too few calls to provide a clear indication of the actual call characteristics. It is an object of this invention to provide a method and apparatus of monitoring multiple communications transactions which alleviates these problems.

DISCLOSURE OF INVENTION

According to one aspect of this invention there is provided a method of monitoring operational status of multiple transactions in a system, each transaction having associated with it multiple successive operational events, comprising the steps of:

acquiring event data from the system relating to multiple operational events in respect of each of multiple transactions;

obtaining from said event data information indicative of the nature of each event;

processing said information to determine the nature of the respective event; and creating a display showing each successive event relating to a transaction on a respective axis for that transaction, and modifying a graphical component of the display to indicate the nature of each event.

According to another aspect of this invention there is provided apparatus for monitoring operational status of multiple transactions in a system, each transaction having associated with it multiple successive operational events, comprising:

a data acquisition device for acquiring event data from the system relating to multiple operational events in respect of each of multiple transactions;

a processor for obtaining from said event data information indicative of the nature of each event, and for processing said information to determine the nature of the respective event; and a display controller for displaying each successive event relating to a transaction on respective axis for that transaction, and modifying a graphical component of the display to indicate the nature of each event.

BRIEF DESCRIPTION OF DRAWINGS

Methods and apparatus in accordance with this invention for monitoring operational status of multiple communications transactions in a communications system including an SS7 signalling network will now be described, by way of example, with reference to the accompanying drawings, in which.

BEST MODE FOR CARRYING OUT THE INVENTION & INDUSTRIAL APPLICABILITY

Figure 1:
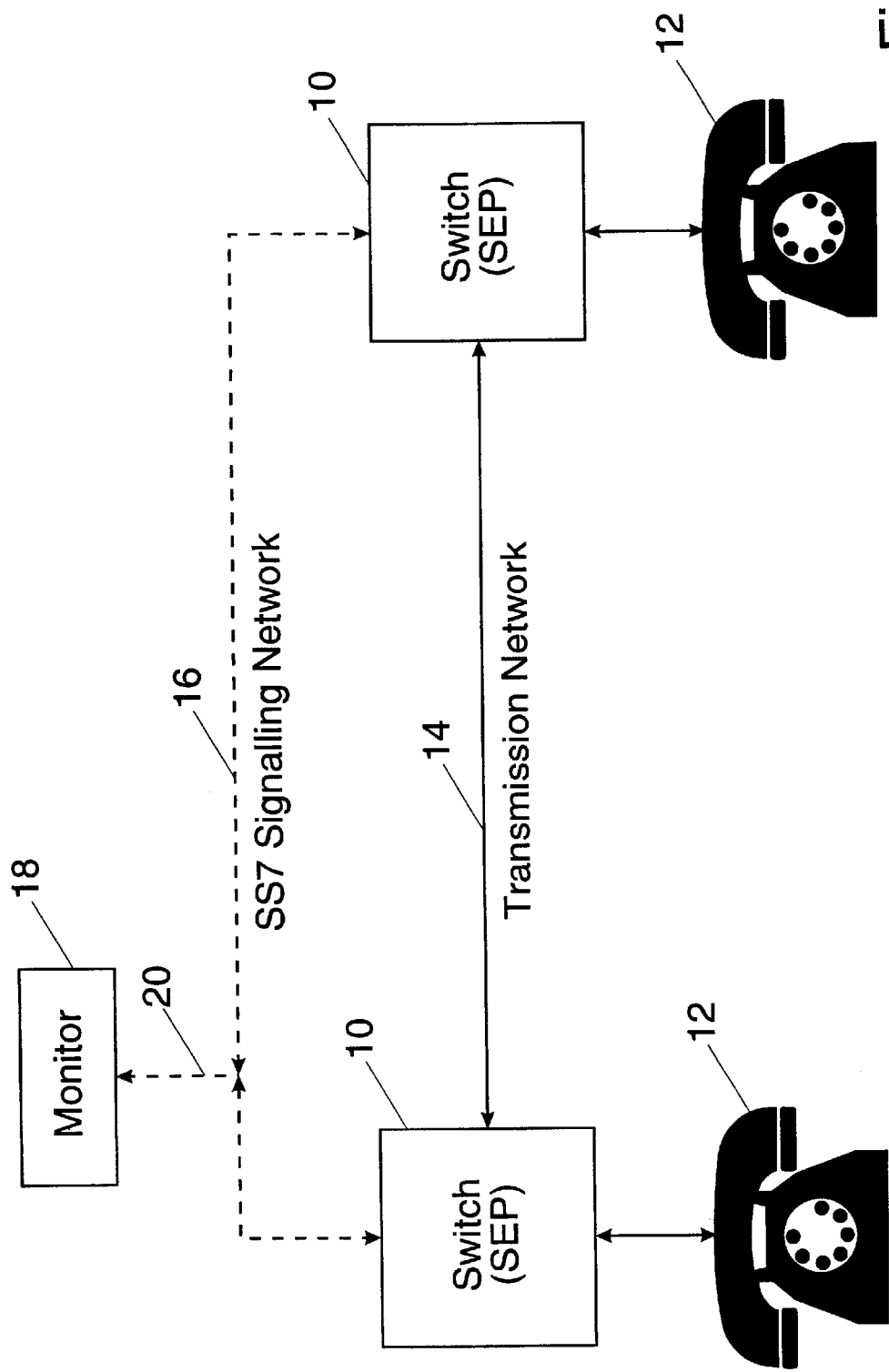
FIG. 1 shows part of a PSTN incorporating an SS7 signalling network.

Referring to FIG. 1, a typical PSTN communications system comprises exchanges switches 10 each providing service to respective subscribers 12. Voice and other data traffic is transferred between subscribers over paths selected by the switches 10 in a transmission network 14 forming part of the system. The switches 10 communicate between themselves, to select communication paths and perform other system management functions, by way of messages transferred over signalling links in a separate signalling network 16. This signalling network typically operates in accordance with the SS7 signalling protocol, and also usually comprises equipment such as signalling transfer points (STPs) and service control points (SCPs), not shown, in addition to the switches 10 themselves which comprise SS7 signalling end points (SEPs). In the SS7 protocol the cycle of setup, maintenance and teardown of a communications transaction such as a telephone call involves exchange of a series of SS7 messages between the relevant SEPs. In detecting, diagnosing and correcting malfunction of the SS7 signalling network it can be helpful to collect and correlate the complete series of such messages relating to a specific transaction or category of transactions. This information can also be helpful for other purposes, such as detection of fraudulent use of the system.

To this end, a monitor 18 in accordance with this invention is connected passively at 20 to the signalling links in the signalling network 16 (i.e. it can receive and store messages from the network, but cannot send messages into it or otherwise actively participate in its operation). In practice a single monitor 18 may be connected to multiple links between multiple SEPs.

Figure 2:
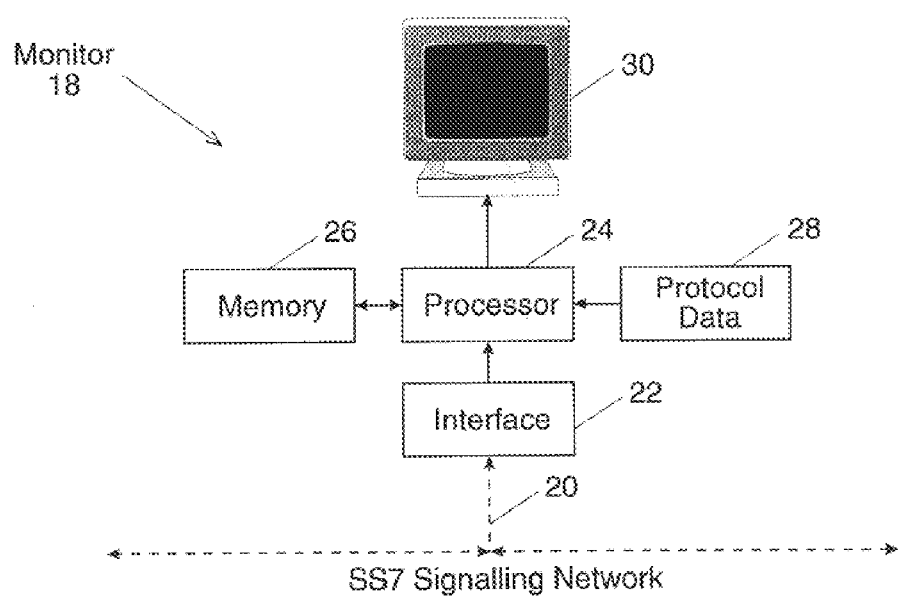
FIG. 2 is a schematic block diagram of the monitoring apparatus.

Referring to FIG. 2, the monitor 18 comprises an interface 22 which provides electrical isolation between the signalling links and the circuitry of the monitor, any necessary signal level translation, and assembly of signal sequences into complete messages; the interface 22 may also provide a filtering function if required, to limit storage of messages to those relating only to specified events and/or to specified communications transactions (e.g. defined by calling or called number, or geographic area).

The received messages are supplied to a processor 24 which typically stores the messages in a buffer forming part of a memory 26 (e.g. random-access memory and/or a hard disc). Messages are retrieved from the buffer by the processor 22 for processing, using information from a protocol data store 28 containing information about the SS7 protocol, such as conversions between digital codes contained within the messages and corresponding commands and data represented by those codes. The processor 22 uses the results of this message processing to derive information for display to a user on a visual display unit (VDU) 30.

Figure 3:
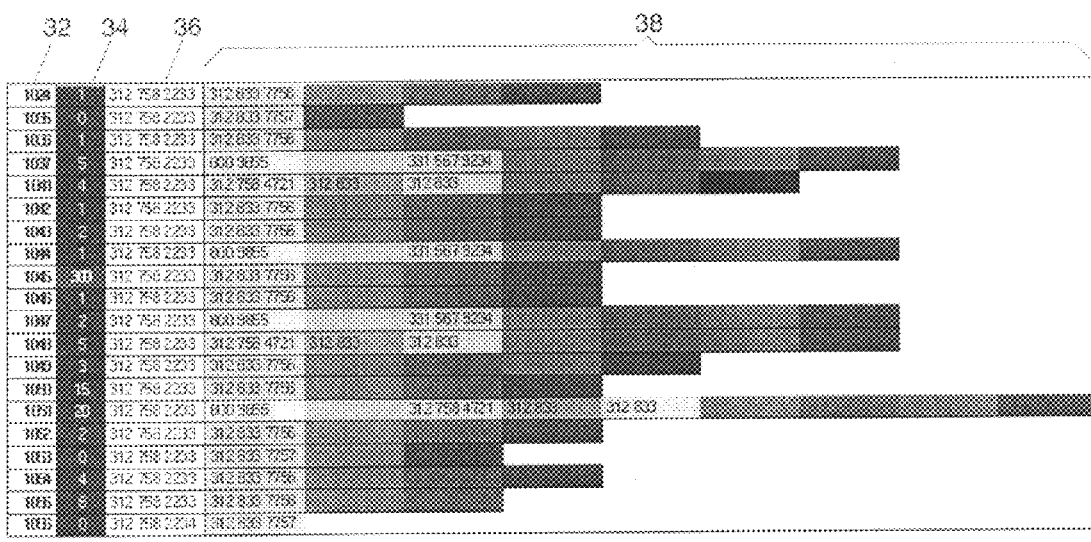
FIG. 3 is an example of a display showing events in respect of multiple communications transactions.

An illustrative display provided to the user is shown in FIG. 3, for the case where the communications transactions are telephone calls over the PSTN. The display comprises a series of lines or axes, in this case parallel to one another and extending as horizontal rows across the display. Each row represents the progress of a single call, and has three fields which are the same for every call:

- a first field 32 comprising a call reference number, by means of which each individual call can be referenced;
- a first field 32 comprising a call reference number, by means of which each individual call a second field 34 showing the call duration, with a visual indication of an exceptional value (e.g. in excess of a predetermined limit), as in the case of call number 1045;
- a third field 36 containing caller information (typically the number of the subscriber originating the call).

The subsequent fields 38 in a row represent successive events in the progress of the corresponding call through its various phases. Each event is represented in the example shown by a block comprising one or more standard-size rectangles, the appearance of which is controlled in accordance with the nature of the event represented. The control of appearance may involve, for example, the use of different shades of grey, or different colours, or different graphic symbols. Other graphical components besides rectangular areas may be used.

In the case of calls on a PSTN, the events depicted may include:
setup
acknowledgement
answer
teardown
release
terminated—cause indication
title translation query
title translation response
AIN (advanced intelligent network) query
AIN response In addition to the control of appearance, significant information such as called or translated number, or termination cause code, may be superimposed on the relevant field in the relevant row.

In practice there will be a continuing flow of new calls to be displayed. It is thus possible that not all calls can be displayed, owing to the number of calls. One or more of several strategies can be used to limit the number of calls for display:

First In First Out:
The earliest calls would be removed from the head of the list as new calls require to be added. However, this may be undesirable if old calls, e.g. long calls not completed, are of interest.

Block on saturation:
Once the visualisation list is full new calls would be ignored. There will be a consequent loss of current data, but this approach may be appropriate in some cases.

Deletion on completion:
Once a call has completed it would be deleted from the list; however these may be the very calls of interest.

Time lapse deletion on completion:
As for the preceding option, but the completed call would only be deleted from the display after a user-defined interval has elapsed.

If call trace records are to be added to and removed from the display, the stability of the display must be considered. As records are removed subsequent remaining records will most usually be realigned on the display. If a busy signalling link is being monitored, this will result in more or less constant movement on the displayed rows. To mitigate the effects of this three "justification" options may be used:

Justify to Top
The call at the top of the view would be fixed and all others would re-position relative to it.

Justify to Bottom
The latest call would be appended at the bottom of the screen and all calls would move above it.

Justify to current:
The Call currently selected by the user would be fixed in the view and all other calls would move relative to it.

Figure 4:
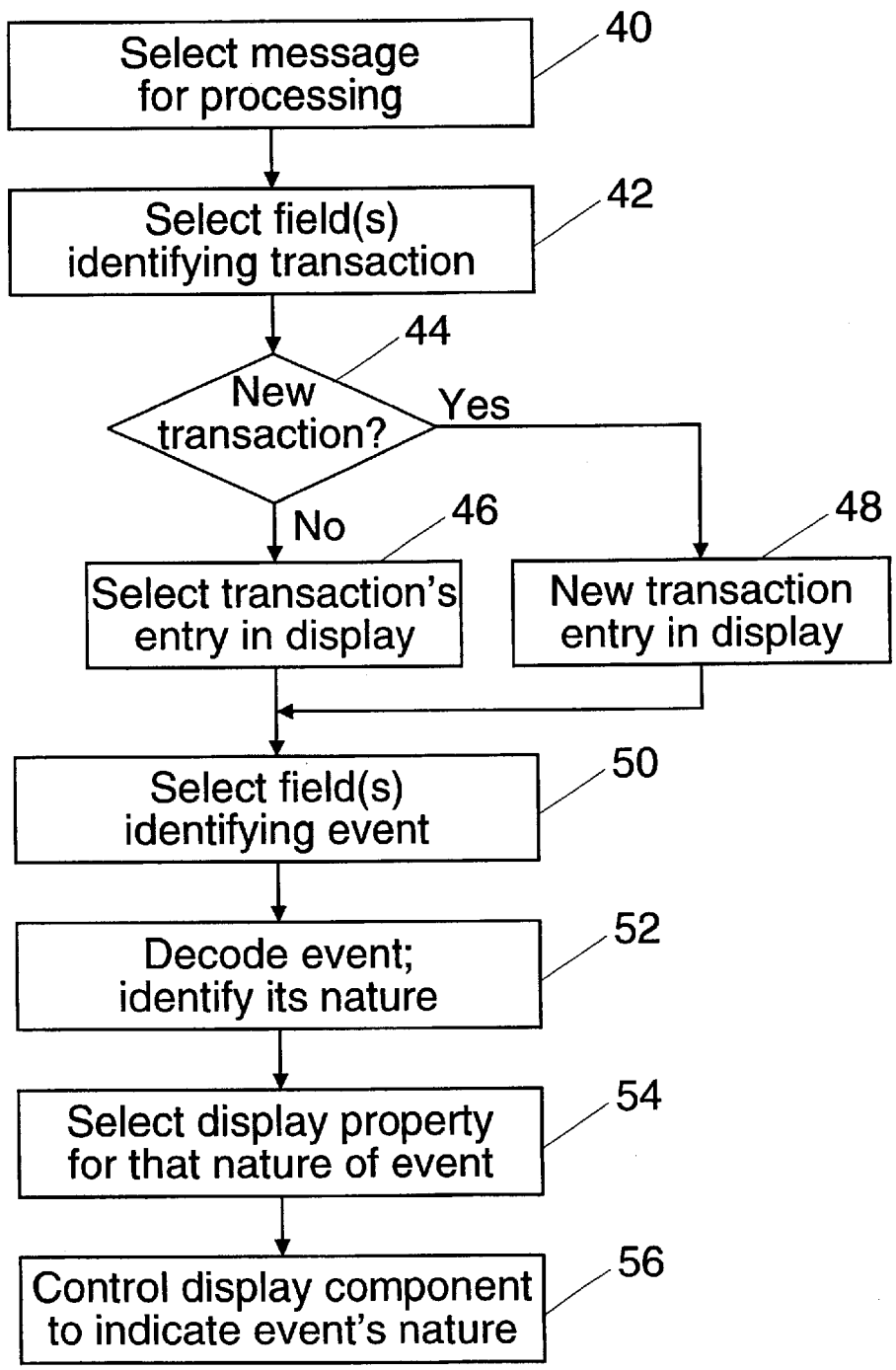
FIG. 4 is a flow chart showing steps implemented by a processor in the monitoring apparatus of FIG. 2 to produce the display of FIG. 3.

FIG. 4 shows a flow chart of the procedure implemented by the processor 24 to control the display on the VDU 30. Referring to FIG. 4, at a first step 40 a message stored in the buffer in the memory 26 is selected for processing; this selection may involve accessing every stored message in turn, or there may be a filtering function as well to restrict processing to particular messages (such as by event type, or identity of communications transaction). At a following step 42 the field or fields are selected in the message which enable identification of the communications transaction to which the message relates; in the case of SS7 messages this might be the originating point code (OPC), destination point code (DPC) and Circuit Identification Code (CIC), or the subscriber numbers of the calling and called parties.

At a decision step 44 a test is made as to whether the communications transaction is already being displayed on the VDU 30, or is a new transaction. If it is not new, the relevant entry (row) being displayed on the VDU 30 is selected at step 46; otherwise a new entry or row is added to the display at step 48.

In either case, at step 50 of the procedure the processor selects a field or fields which enable the event involved in the current message to be identified, and at step 52 the data in the selected field(s) are decoded, by reference to information in the protocol data store 28, to identify the nature of the event. This step may require correlating information from multiple messages to complete identification of the event and its nature.

At step 54 the identified nature of the event is used to determine the corresponding display property (such as shade of grey, colour or graphical symbol), and at step 56 the relevant graphical component in the display (i.e. the appropriate rectangular area in the row or the transaction in question) is controlled accordingly to indicate the nature of the event.

The invention has been described above in the context of monitoring communications transactions in a communications system carrying real subscriber data. However it is also applicable in, for example, a development environment, for which the monitor 18 could be combined with an emulator for producing simulated SS7 message sequences; these simulated sequences could be supplied as input stimuli to an isolated piece of SS7 network equipment, such as an STP under development or test, and the results of processing of the message sequences by that piece of equipment could be examined using the monitor.

What is claimed is:

1. A method of monitoring operational status of multiple communication transactions in a communications system, each transaction involving the occurrence of multiple successive operational events for coordinating communication in the transaction, comprising the steps of:

acquiring operational event data from the system relating to multiple operational events for coordinating communication in each multiple communication transaction, said operational events including for each transaction at least one event which specifies an identity related to the transaction;

obtaining information from said operational event data, said information being indicative of the nature of each operational event;

processing said information to determine the nature of the respective operational event; and creating a display showing each successive operational event relating to a communication transaction on a respective axis for that transaction, and modifying appearance other than text of a display graphical component to indicate the nature of each operational event.

2. The method of claim 1, wherein said operational event data are acquired by monitoring messages in a signalling network for the communications system.

3. The method of claim 2, wherein said signalling network is an SS7 signalling network in the telecommunications system.

4. The method of claim 1, wherein said operational event data are acquired by monitoring the contents of identifying or routing information associated with data transferred in the communications system.

5. The method of claim 4, wherein said identifying or routing information comprises packet or frame headers associated with data transferred in the communications system.

6. The method of claim 1, wherein axes for respective communications transactions extend parallel to one another.

7. The method of claim 1, wherein at least one of said steps of acquiring operational event data and of obtaining information involves selection of a subset of operational event data from a larger amount of available operational event data.

8. The method of claim 1, wherein said operational event data are generated by an emulator for stimulating a system under test.

9. The method of claim 1, wherein the identity related to a transaction is at least one of called number, translated number, calling number, originating point code, destination point code, circuit identification code, transaction identifier and intended recipient.

10. The method of claim 1, wherein the appearance of a display graphical component is modified by controlling use of at least one of: different shades of gray, different colors, and different graphical symbols.

11. Apparatus for monitoring operational status of multiple communications transactions in a communications system, each transaction involving the occurrence of multiple successive operational events for coordinating communication in the transaction, comprising:

a data acquisition device for acquiring operational event data from the system relating to multiple operational events for coordinating communication in each of multiple communications transactions, said operational events including for each transaction at least one event which specifies an identity related to the transaction;

a processor for obtaining from said operational event data information indicative of the nature of each operational event, and for processing said information to determine the nature of the respective operational event; and a display controller for displaying each successive operational event relating to a communication transaction on a respective axis for that transaction, and for modifying appearance other than text of a display graphical component to indicate the nature of each operational event.

* * * * *